United States Patent
Pleschke et al.

(10) Patent No.: US 6,634,702 B1
(45) Date of Patent: Oct. 21, 2003

(54) FRONT-END MODULE FOR A MOTOR VEHICLE

(75) Inventors: Thomas Pleschke, Weissenburg (DE); Hans-Jürgen Wolf, Attendorn (DE)

(73) Assignee: Dynamit Nobel Kunststoff GmbH, Weissenburg (DE)

( * ) Notice: Subject to any disclaimer, the term of this patent is extended or adjusted under 35 U.S.C. 154(b) by 0 days.

(21) Appl. No.: 10/009,533

(22) PCT Filed: May 8, 2000

(86) PCT No.: PCT/EP00/05292

§ 371 (c)(1),
(2), (4) Date: May 28, 2002

(87) PCT Pub. No.: WO01/00478

PCT Pub. Date: Jan. 4, 2001

(30) Foreign Application Priority Data

Jun. 23, 1999 (DE) .......................................... 199 28 447
Sep. 7, 1999 (DE) .......................................... 199 42 602
Jan. 21, 2000 (DE) .......................................... 100 02 499

(51) Int. Cl.$^7$ ............................................. B62D 29/00
(52) U.S. Cl. .................. 296/194; 296/203.02; 293/102; 293/120

(58) Field of Search ................................. 296/194, 196, 296/197, 203.02; 293/102, 120, 132, 135

(56) References Cited

U.S. PATENT DOCUMENTS

| 607,901 | A | * | 7/1898 | Woodworth | 293/120 |
| 5,271,473 | A | * | 12/1993 | Ikeda et al. | 296/194 |
| 5,348,114 | A | * | 9/1994 | Yamauchi | 296/203.02 |
| 5,358,304 | A | * | 10/1994 | Kanemitsu et al. | 296/194 |
| 5,533,780 | A | * | 7/1996 | Larson et al. | 296/194 |
| 5,597,198 | A | * | 1/1997 | Takanishi et al. | 296/194 |

* cited by examiner

*Primary Examiner*—D. Glenn Dayoan
*Assistant Examiner*—Lori L Coletta
(74) *Attorney, Agent, or Firm*—Antonelli, Terry, Stout & Kraus, LLP

(57) ABSTRACT

The invention relates to a front end module for a motor vehicle with a front end assembly support (2) between the bumper seats (3) and with a bumper transverse support (5) connecting the longitudinal supports (4) of the motor vehicle. In order to reduce the individual parts and the weight, it is proposed that the bumper transverse support (5) and the assembly support (2) are integrally manufactured in a plastics material injection moulding process as a hybrid component with sheet metal parts (6, 7) placed into the casting mould.

13 Claims, 2 Drawing Sheets

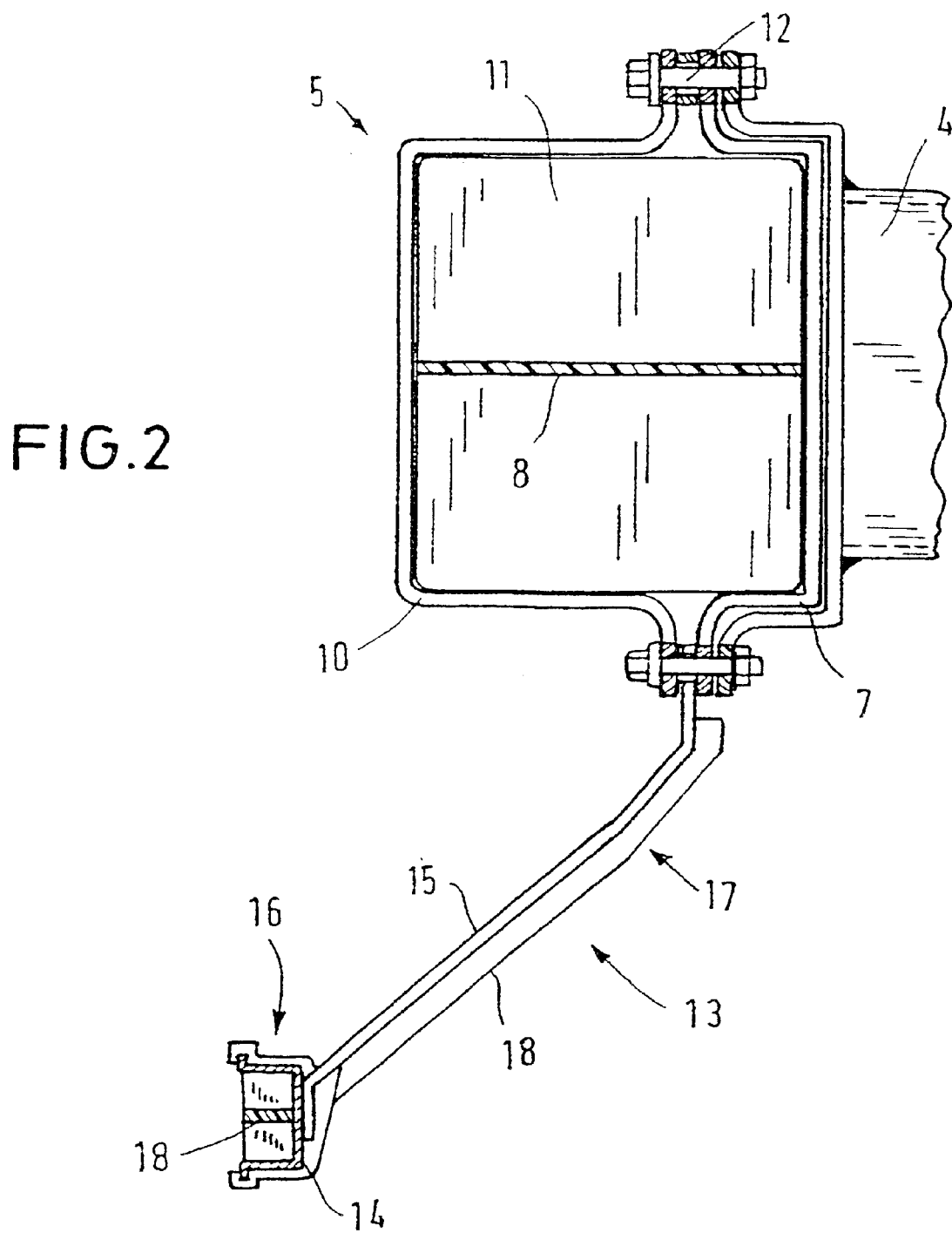

FRONT-END MODULE FOR A MOTOR VEHICLE

BACKGROUND OF THE INVENTION.

The invention relates to a front end module for a motor vehicle with a front end assembly support between the mudguard seats and with a bumper transverse support connecting the longitudinal supports of the motor vehicle, and a method of manufacturing said front end module.

The assembly support in the form of the front closure of the motor vehicle chassis comprises the connection between the mudguard seats (=upper longitudinal supports) with the receiving element for the bonnet lock, securing elements arranged laterally to the longitudinal axis of the vehicle for headlights, and fixtures for the mudguards and longitudinal supports as well as the radiator support.

In the past, assembly supports were mostly made of sheet steel, and more recently of plastic materials, such as polyamide 6, polyamide 6.6, polybutylterephthalate, polypropylene, sheet moulding compositions (SMC), glass mat-reinforced thermoplastics (GMT) or long fibre-reinforced thermoplastics (LFT). In the case of solutions involving metal, essentially structure supporting properties are the focus. In the case of solutions involving plastics materials, the main aim is predominantly assembly which is to be as simple and as cost-effective as possible. The use of solutions involving plastics materials has been made possible by the development of substantially more rigid structure supporting systems, comprising longitudinal supports and transverse support systems for bumpers.

Assembly supports (lock bridges, radiator support modules) made of plastics material considerably simplify the integration of function subassemblies such as radiators, headlights, bonnet locks, securing devices, etc. as a result of the possibility of simplified and more cost-effective moulding as compared with a steel solution.

Assembly supports and bumper transverse supports are usually considered as separate partial modules today and are therefore developed independently of one another. The developmental focus points of functional integration on the part of the assembly supports and structural rigidity and energy absorption on the part of the bumper transverse support prevent, as a result of their being separately considered, an adequate integration of components and functions and therefore an efficient and cost-effective light construction.

Assembly supports and bumper transverse supports are, however, closely adjacent subassemblies, which are connected to one another directly or via the flange plates of the longitudinal supports on the one hand and via the securing of the bumper skin and the foam which may lie behind the bumper skin on the other hand. The close vicinity means that the assembly support system is subjected to collision-related forces in the same manner as the bumper transverse support system. Nowadays, in order to reinforce plastics material assembly supports, a metallic connection is already optionally fitted in a horizontal position between the mudguard seats (upper transverse support).

This connection is essentially used for stabilising the front of the vehicle against an impact, which conforms to testing with a soft barrier. Another possible option is additional vertical sheet metal reinforcements of the plastics material support between the upper transverse support and the longitudinal supports.

Besides this, there is the requirement of function integration for the bumper transverse support, amongst other things, in respect of the fixing of the bumper skin, the securing of the headlights, sidelights and of the headlight washing nozzles, the integration of distance and crash sensor systems and of the horn, as well as the securing of elements for pedestrian protection such as energy absorbing foams and spoiler reinforcements.

In order to combine both features with one another, namely function integration of the plastics material and rigidity of the metal structure, the approach which has been followed in recent times is one of providing injection moulded or pressed plastics material supports with reinforcements made of metal. These reinforcements are usually bonded, riveted or screwed into place.

SUMMARY OF THE INVENTION

A modern possibility of combining both material features is direct manufacture by moulding-in a sheet metal part during the plastics material moulding.

It is the object of the invention to improve a front end module for a motor vehicle with a front end assembly support and with a bumper transverse support connecting the longitudinal supports of the motor vehicle in such a manner that it can be manufactured in an essentially lighter and more cost-effective manner and comprises fewer individual parts.

This object is attained according to the invention in that the bumper transverse support and the assembly support are integrally manufactured with optional reinforcements in a plastics material injection moulding process in which a plastics material/metal composite component with sheet metal parts is placed into the casting mould.

In a preferred embodiment, a sheet metal part connecting the mudguard seats is provided for the assembly support and a sheet metal part connecting the longitudinal supports of the motor vehicle is provided for the bumper transverse support, the sheet metal parts comprising a profile having a U-shaped cross section and being reinforced by the moulding-in of cross ribs or similar plastics material ribs.

In this respect, the assembly support and the bumper transverse support are connected by connecting cheeks of plastics material or even by vertical plastics material/metal composite profiles. It is important in this instance, however, that the plastics material/metal composite component is manufactured in an injection moulding process with the sheet metal parts inserted.

However, in cases where the connection between the longitudinal supports provided by the bumper transverse support (in the region of the original transverse support) is not in a position to fully replace the original transverse support system, in order to reinforce this region, it is proposed to position an open metallic U-profile or a closing plate on the plastics material/metal composite profile and to connect the parts in a manner complying with this requirements.

According to the invention, for the bumper transverse support an outer shell of sheet metal having a U-shaped profile is expediently placed onto the inner shell, which faces the chassis, is open in the direction of travel and forms part of the front end module, so that an inner cavity is formed. This cavity can be entirely or partially filled with ribs of plastics material.

In this respect, the outer shell is preferably connected to the inner shell by screws, particularly with prestressing, by riveting through joints in the region of the flanks, clinching, adhesion, welding or interlocking joints. The outer shell and the inner shell preferably comprise a positive-locking connection in the shearing plane.

According to the invention, this system can be reversed in its orientation if the original outer shell of sheet metal is fitted to the chassis with its opening in the direction of travel prior to the assembly of the front module. The plastics material/metal composite component, which receives the counter shell by injection moulding with its opening in the opposite direction to the direction of travel, possibly following preassembly with attaching parts, can then be fitted to the vehicle in a later step by pushing onto the sheet metal shell. In this case, the outer shell, which is fitted to the vehicle prior to the painting process, can act as a spacing element for the longitudinal supports during the protective painting, in order to reduce warping as a result of thermal stresses from the welding processes.

In a particularly preferred embodiment, the profile of the plastics material ribs partially or fully fills the inner cavity of the bumper transverse support in the longitudinal direction of the vehicle, the plastics material ribs extending in the longitudinal direction of the vehicle.

Alternatively, in a special embodiment, a pedestrian protection is advantageously arranged beneath the bumper transverse support, which is also integrally manufactured with the upper transverse support and the bumper transverse support in a plastics material injection moulding process as a hybrid component with sheet metal parts inserted into the casting mould.

The pedestrian protection preferably comprises a profile extending transversely to the longitudinal direction of the vehicle and connecting struts to the bumper transverse support.

The sheet metal parts of the pedestrian protection preferably comprise a U-shaped profile and are filled with plastic material ribs.

The pedestrian protection acts as a support for a spoiler, which is arranged at a short distance in front of the pedestrian protection.

A preferred method of manufacturing a front end module is characterised in that sheet metal parts for the assembly support and the bumper transverse support are placed into a plastics material injection mould and the sheet metal parts are reinforced and connected to one another by the moulding-in of plastics material ribs.

If a pedestrian protection is required, additional sheet metal parts are placed into the casting mould.

In order to carry out the method, a sheet metal part connecting the longitudinal supports of the motor vehicle is constructed as an inner shell with a reduced wall thickness as compared with the conventional wall thickness. This metal sheet is placed together with further metal sheets, e.g. for the upper transverse support, for the pedestrian protection or for anti-theft protection, into the injection moulding tool. The sheet metal parts are connected to one another and reinforced by the moulding-in of cross ribs or similar ribs made of the above-mentioned plastics materials in the injection moulding process. In this manner, the sheet metal parts are introduced into the plastics material/metal composite component in a single production step. A plastics material/sheet metal composite is produced, which can be screwed or welded to the chassis by means of the corresponding securing points (=longitudinal support, upper longitudinal support/mudguard seat) and is in a position to keep the front of the vehicle stable during the entire assembly phase, in particular during the protective painting. Alternatively, the system can be preassembled complete with front headlights, cooling system and other components, and fitted at the vehicle manufacturer's following the protective painting.

The plastics material portion may also act as a guiding aid for the U-profile which is placed on top. In this respect, it is advantageous if the profile of the plastics material ribs fill the entire cavity of the transverse support.

Important for the efficient use of both support systems is the manner in which the systems are connected. In this respect, it is known that two connected half shells exhibit considerably higher bending resistance than two connected in parallel. Of decisive importance therefore is the transmission of shearing forces between the components in the transverse direction of the vehicle. Various technologies are available in order to provide a shear-free connection of the steel U-profile with the hybrid profile. This includes screwing with corresponding prestressing, riveting or through joining in the region of the flanks, clinching, adhesion and welding.

According to the invention, the most economic joining technique is desired. To this end, an intelocking connection of both systems in the shearing plane is proposed. This interlocking connection may be realised, inter alia, toothings or deformations in the region of the shell edge, the counterparts of which are disposed in the region of the plastics material or the sheet metal of the opposite side.

The advantages of this inherently preassemblable system are substantial weight and cost savings, the possibility of function integration in the vicinity of the transverse support (amongst other things bumper cover=bumper cladding) and headlight mount, elements for the pedestrian protection (=reinforcing pedestrian protection), grills, sidelights, and the saving of guide and support elements in the region of the assembly support. In this way, the construction makes do with considerably fewer individual parts and joining steps as compared with conventional systems. The overall module can be screwed with optional energy absorbing elements to a front end structure, which can be fitted prior to the anti-rust coating of the overall chassis, but also offers the possibility, by way of prior surface coating, of acting as a support for a preassembled front end.

Further features of the invention will be clear from the drawings, which are described in the following. In the drawings:

BRIEF DESCRIPTION OF THE DRAWINGS

FIG. 2 is a section through the front end module according to FIG. 1 taken along line II—II.

DETAILED DESCRIPTION OF THE PREFERRED EMBODIMENTS

Figure 1:
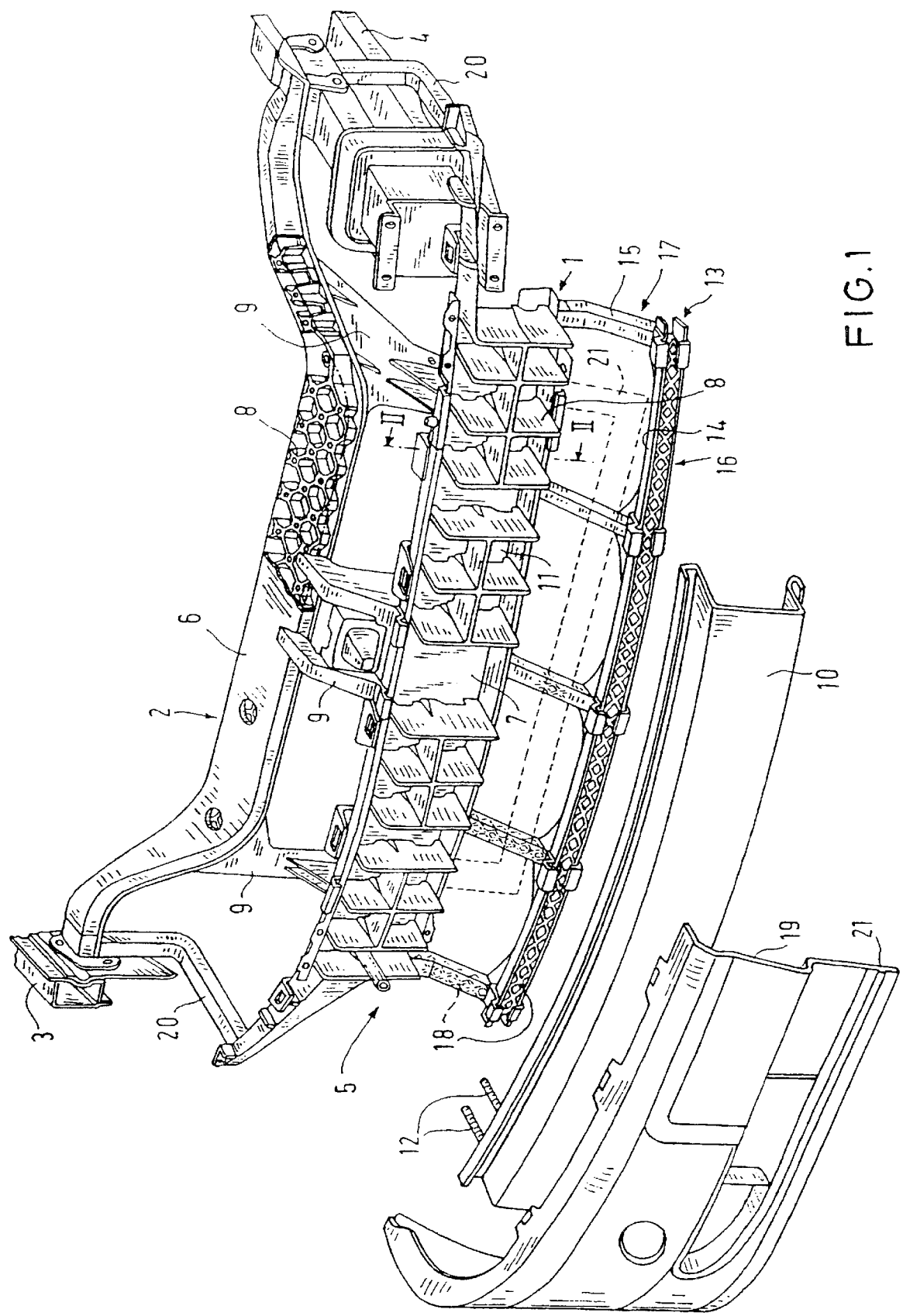
FIG. 1 shows a front end module according to the invention with parts of a motor vehicle, to which it is secured.

In the embodiment as shown here, the front end module 1 is formed by an assembly support or an upper transverse support 2, a bumper transverse support 5 and, optionally a pedestrian protection 16. The outer cladding 19, inter alia, is placed onto this front end module 1.

The assembly support 2 is secured to the mudguard seats 3 and the bumper transverse support 5 is secured to the longitudinal supports 4 of the motor vehicle. The assembly support 2 is formed from a continuous sheet metal part 6, into which plastics material ribs 8 are moulded for reinforcement.

The bumper transverse support 5 consists of an inner sheet metal shell 7 which has a U-shaped profile. Optionally fitted to this inner shell 7 is an outer shell 10, so that a cavity 11 is formed. Plastics material ribs 8, are arranged in the cavity 11, so as to completely fill the cavity 11 in the longitudinal direction of the motor vehicle. The assembly support 2 is connected to the bumper transverse support 5 by connecting cheeks 9 made of plastics material or a plastics material/metal composite. Alternatively, outer connecting cheeks 20, also made of plastics material, can also be provided.

Optionally arranged beneath the bumper transverse support 5 and not absolutely necessary for the front end module is a pedestrian protection 16, which is formed by a part 13 arranged transversely to the vehicle and connecting struts 17 to the bumper transverse support 5. The part 13 arranged transversely to the vehicle acts as a support for a spoiler 21 of the outer cladding 19. The part 13 is also moulded as a hybrid component and is formed by a sheet metal part 14 having a U-shaped cross section, which is filled with plastics material ribs 18. The connecting struts 17 are also formed by sheet metal parts 15 having a U-shaped cross section, which are also filled with plastics material ribs 18.

The assembly support 2, bumper transverse support 5 and pedestrian protection part 16 are integrally manufactured in a single working step in an injection moulding process. To this end, the sheet metal parts 6, 7, 14, 15 are placed in the plastic material injection mould and all the plastics material contours are moulded into or onto the sheet metal parts during the subsequent injection moulding process. The plastics material contours are, inter alia, the plastics material ribs 8 in the assembly support 2 and in the bumper transverse support 5, the connecting cheeks 3, if desired the additional outer connecting cheeks 20, optionally the radiator trussing 21 and the plastics material ribs 18 in the pedestrian protection 16, both in the part 13 and in the connecting struts 17.

It is then only necessary to secure the outer shell 10 to the inner shell 7, e.g. by means of screws 12, for further reinforcement.

What is claimed is:

1. A front end module for a motor vehicle with a front end assembly support and with a bumper transverse support connecting longitudinal supports of the motor vehicle, characterised in that the bumper transverse support and the front end assembly support are integrally manufactured in a plastic material injection moulding process as a hybrid component with sheet metal parts being placed in the casting mould, the sheet metal parts being reinforced by the moulding-in of cross ribs or similar plastic material ribs, wherein the profile of the plastics material ribs partially or completely fills an inner cavity of the bumper transverse support in the longitudinal direction of the vehicle.

2. A front end module according to claim 1, characterised in that a sheet metal part connecting mudguard seats of the motor vehicle is provided for the front end assembly support and a sheet metal part connecting the longitudinal supports of the motor vehicle is provided for the bumper transverse support.

3. A front end module according to claim 2, characterised in that the sheet metal parts have a profile which is U-shaped in cross section.

4. A front end module according to claim 1, characterised in that the front end assembly support and the bumper transverse support are connected by connecting cheeks made of plastic material or a plastic and metal composite.

5. A front end module according to claim 2, characterised in that an outer shell made of sheet metal and having a U-shaped profile is placed onto an inner shell formed by the injection moulded bumper transverse support to form the inner cavity between the inner shell and the outer shell.

6. A front end module according to claim 5, characterised in that the outer shell is connected to the inner shell by screws, by riveting, through joining in the region of the flanks, clinching, adhesion, welding or interlocking joints.

7. A front end module according to claim 6, characterised in that the outer shell and the inner shell comprise an interlocking joint in the shearing plane.

8. A front end module for a motor vehicle with a front end assembly support and with a bumper transverse support connecting longitudinal supports of the motor vehicle, characterised in that the bumper transverse support and the assembly support are integrally manufactured in a plastic material injection moulding process as a hybrid component with sheet metal parts being placed in the casting mould, the sheet metal parts being reinforced by the moulding-in of cross ribs or similar plastic material ribs, wherein the plastic material ribs extend in the longitudinal direction of the vehicle.

9. A front end module according to claim 1, characterised in that arranged beneath the bumper transverse support is a pedestrian protection, which is also integrally manufactured with the front end assembly support and the bumper transverse support in a plastic material injection moulding process as a hybrid component with sheet metal parts placed into the casting mould.

10. A front end module according to claim 9, charactrerised in that the pedestrian protection is formed by a part extending transversely to the longitudinal direction of the vehicle and connecting struts to the bumper transverse support.

11. A front end module according to claim 9, characterised in that the sheet metal parts of the pedestrian protection have a U-shaped profile and are filled with plastic material ribs.

12. A method of manufacturing a front end module for a motor vehicle with an assembly support between mudguard seats of the motor vehicle and with a bumper transverse support connecting longitudinal supports of the motor vehicle, characterised in that sheet metal parts for the upper transverse support and the bumper transverse support are placed in an injection mould for plastic material and the sheet metal parts are reinforced and connection with one another by the moulding-in of plastic material ribs, the plastic material ribs extending in the longitudinal direction of the vehicle.

13. A method according to claim 12, characterised in that additional sheet metal parts for a pedestrian protection arranged beneath the bumper transverse support are placed in the casting mould.

* * * * *